(12) United States Patent
Chhabra et al.

(10) Patent No.: US 11,368,403 B2
(45) Date of Patent: Jun. 21, 2022

(54) ACCESS MANAGEMENT TAGS

(71) Applicant: Amazon Technologies, Inc., Seattle, WA (US)

(72) Inventors: Jasmeet Chhabra, Sammamish, WA (US); Jing Zhuang, Seattle, WA (US); Uzma Arjuman, Seattle, WA (US); Ajith Harshana Ranabahu, Bothell, WA (US); Travis William Hickey, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/028,756

(22) Filed: Sep. 22, 2020

(65) Prior Publication Data

US 2021/0014172 A1 Jan. 14, 2021

Related U.S. Application Data

(63) Continuation of application No. 16/183,484, filed on Nov. 7, 2018, now Pat. No. 10,819,652.
(Continued)

(51) Int. Cl.
*G06F 15/16* (2006.01)
*H04L 47/70* (2022.01)
*H04L 41/0893* (2022.01)

(52) U.S. Cl.
CPC .......... *H04L 47/70* (2013.01); *H04L 41/0893* (2013.01)

(58) Field of Classification Search
CPC ............................ H04L 47/70; H04L 41/0893
(Continued)

(56) References Cited

U.S. PATENT DOCUMENTS

| 5,862,517 A | 1/1999 | Honey et al. |
| 6,101,460 A * | 8/2000 | Brinkerhoff ..... G06Q 10/06315 702/179 |

(Continued)

FOREIGN PATENT DOCUMENTS

| WO | WO2011062743 A2 | 5/2011 | |
| WO | WO-2014116748 A1 * | 7/2014 | ......... G06F 21/6209 |
| WO | WO2014116748 A1 | 7/2014 | |

OTHER PUBLICATIONS

Office Action for U.S. Appl. No. 16/183,484, dated May 13, 2020, Chhabra, "Access Management Tags," 4 pages.
(Continued)

*Primary Examiner* — Alicia Baturay
(74) *Attorney, Agent, or Firm* — Lee & Hayes, P.C.

(57) ABSTRACT

Tags may be used in decisions by an access management service regarding access of computing resources ("resources") by principals (e.g., users, roles, etc.). The tags may also be used to determine cost information, for grouping resources and/or principals, and for other reasons. The tags may be assigned to principals, to resources, or both. The resource may be a virtual or physical type of computing resource. Tags may be metadata, which may include a key-value pair. Tags may include email addresses, cost centers, project identifiers, location, team name, etc. The value may be a number, letters, or a combination of both. In some embodiments, the values may be limited to certain numbers or bytes, and some numbers and/or letter combinations may be excluded for special use.

20 Claims, 12 Drawing Sheets

Related U.S. Application Data

(60) Provisional application No. 62/692,984, filed on Jul. 2, 2018.

(58) Field of Classification Search
USPC ............................................................. 709/225
See application file for complete search history.

(56) References Cited

U.S. PATENT DOCUMENTS

| | | | |
|---|---|---|---|
| 6,321,267 B1 | 11/2001 | Donaldson | |
| 6,732,179 B1* | 5/2004 | Brown | G06F 21/10 709/225 |
| 7,246,201 B2* | 7/2007 | Wu | G06F 21/604 711/119 |
| 7,249,175 B1 | 7/2007 | Donaldson | |
| 7,457,872 B2 | 11/2008 | Aton et al. | |
| 7,603,425 B2 | 10/2009 | DiPlacido et al. | |
| 7,757,271 B2* | 7/2010 | Amdur | H04L 63/20 726/1 |
| 7,991,766 B2 | 8/2011 | Srinivasan et al. | |
| 8,019,814 B2 | 9/2011 | Bou-Ghannam et al. | |
| 8,161,120 B2 | 4/2012 | Tan | |
| 8,356,337 B2* | 1/2013 | Scott | G06F 21/604 713/168 |
| 8,566,330 B1* | 10/2013 | Barak | G06F 16/9577 707/748 |
| 8,752,045 B2* | 6/2014 | Fitzgerald | G06F 9/5077 718/1 |
| 8,825,749 B2 | 9/2014 | Tully et al. | |
| 9,038,168 B2* | 5/2015 | Ben-Zvi | G06F 21/6218 713/182 |
| 9,075,883 B2 | 7/2015 | Verkasalo | |
| 9,418,493 B1 | 8/2016 | Dong | |
| 9,530,020 B2* | 12/2016 | Brandwine | G06F 21/6218 |
| 9,576,141 B2* | 2/2017 | Brandwine | G06F 21/6209 |
| 9,839,838 B1* | 12/2017 | Conti | A63F 13/35 |
| 9,900,322 B2* | 2/2018 | Lietz | G06F 21/604 |
| 10,195,520 B1* | 2/2019 | Conti | A63F 13/44 |
| 10,216,716 B2* | 2/2019 | Duman | G06F 40/169 |
| 10,296,327 B2* | 2/2019 | Conti | A63F 13/44 |
| 10,334,426 B2 | 6/2019 | Pitti | |
| 10,341,281 B2* | 7/2019 | Brandwine | H04L 51/32 |
| 10,430,441 B1* | 10/2019 | Canton | G06F 16/24564 |
| 10,496,542 B1* | 12/2019 | Allu | G06F 12/0808 |
| 10,506,268 B2* | 12/2019 | Pompa | H04N 21/4622 |
| 10,721,141 B1* | 7/2020 | Verma | H04L 41/5054 |
| 10,805,188 B2* | 10/2020 | Arora | G06F 11/3006 |
| 10,819,652 B2* | 10/2020 | Chhabra | G06F 21/6218 |
| 2003/0003861 A1 | 1/2003 | Kagemoto et al. | |
| 2005/0080857 A1 | 4/2005 | Kirsch et al. | |
| 2005/0091319 A1 | 4/2005 | Kirsch | |
| 2005/0091320 A1 | 4/2005 | Kirsch et al. | |
| 2005/0198159 A1 | 9/2005 | Kirsch | |
| 2008/0133486 A1 | 6/2008 | Fitzgerald et al. | |
| 2009/0030783 A1 | 1/2009 | Schloo | |
| 2009/0222541 A1 | 9/2009 | Monga et al. | |
| 2009/0300169 A1 | 12/2009 | Sagar et al. | |
| 2011/0321122 A1* | 12/2011 | Mwangi | G16H 10/60 726/1 |
| 2012/0166552 A1 | 6/2012 | Seligstein et al. | |
| 2013/0067544 A1 | 3/2013 | Kwark et al. | |
| 2014/0081624 A1* | 3/2014 | Morris | G06F 9/45558 704/9 |
| 2014/0081966 A1* | 3/2014 | Morris | G06F 16/907 707/736 |
| 2014/0081967 A1* | 3/2014 | Morris | G06F 16/907 707/736 |
| 2014/0081969 A1* | 3/2014 | Morris | G06F 16/907 707/736 |
| 2014/0081981 A1* | 3/2014 | Morris | G06Q 30/02 707/E17.083 |
| 2016/0065666 A1 | 3/2016 | Kim et al. | |
| 2016/0117594 A1 | 4/2016 | Perez Ramos et al. | |
| 2016/0162521 A1 | 6/2016 | Pradhan et al. | |
| 2017/0109762 A1 | 4/2017 | Kim et al. | |
| 2018/0041587 A1 | 2/2018 | Das et al. | |
| 2018/0337864 A1 | 11/2018 | Wagstaff | |
| 2018/0373419 A1 | 12/2018 | Chen et al. | |
| 2019/0116487 A1 | 4/2019 | Pitti | |
| 2019/0260797 A1 | 8/2019 | Yun et al. | |
| 2019/0333113 A1 | 10/2019 | Carlson et al. | |
| 2020/0034752 A1 | 1/2020 | Luo et al. | |

OTHER PUBLICATIONS

PCT Search Report and Written Opinion dated Oct. 8, 2019 for PCT Application No. PCT/US2019/039451, 12 pages.

* cited by examiner

ACCESS MANAGEMENT TAGS

CROSS-REFERENCE TO RELATED APPLICATIONS

This Application is a continuation of U.S. patent application Ser. No. 16/183,484, filed on Nov. 7, 2018, which is a non-provisional of, and claims priority under 35 U.S.C. § 119(e) to, U.S. Provisional Application No. 62/692,984, of the same title, filed on Jul. 2, 2018, the entirety of which is hereby incorporated by reference.

BACKGROUND

Access managers often rely on access control lists to control access to different resources. To be able to gain access, a user's identifier must be listed as an approved user of a resource. The user then typically has to provide some type of credentials, such as a password or token, to gain access to the resource along with their identifier. Although this approach is robust, it can be difficult to manage and lacks flexibility to enable administrators to quickly and easily grant access to new resources and/or update access for existing resources.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
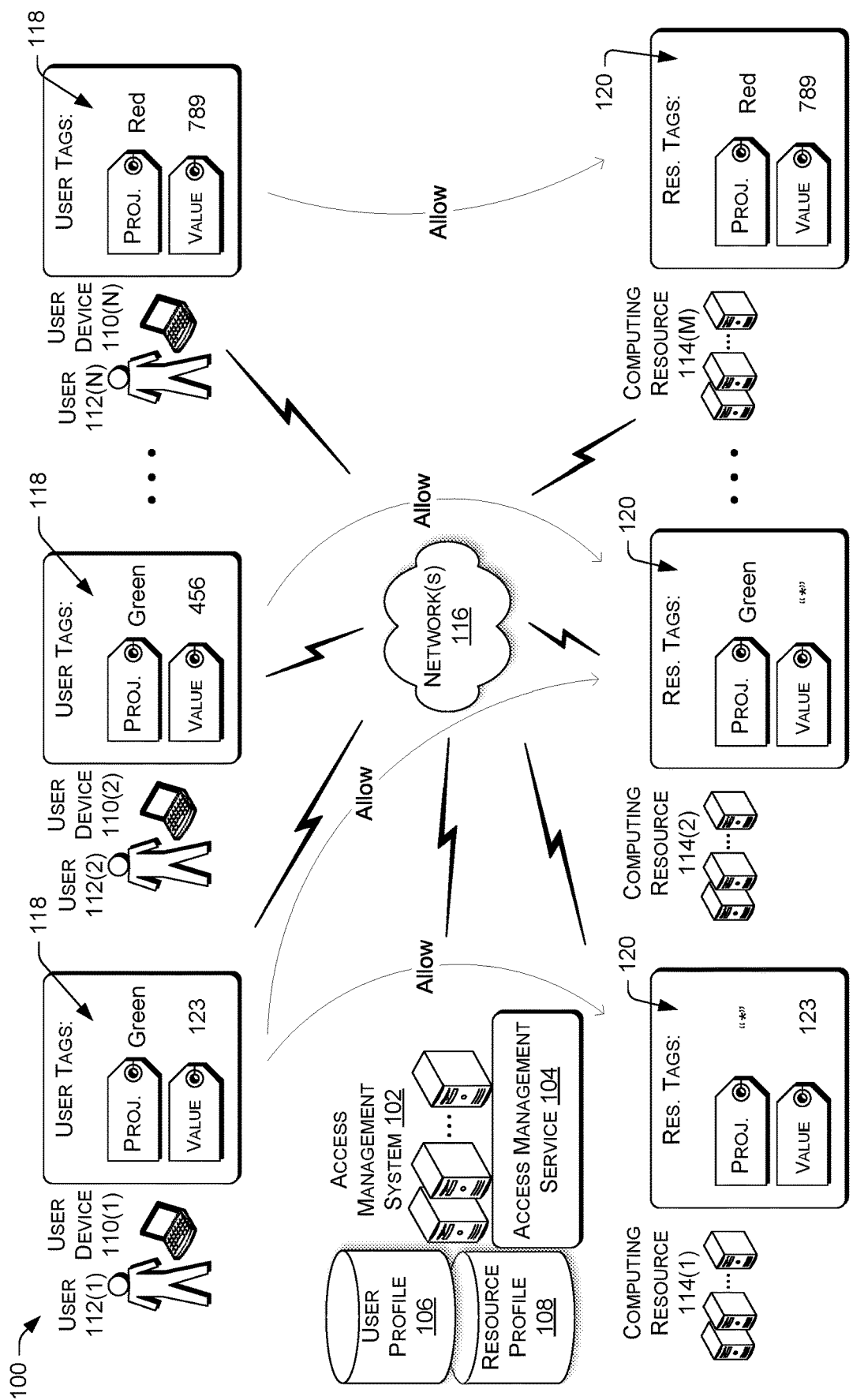
FIG. 1 is a block diagram of an illustrative environment that includes an access management system configured to create and use access management tags for users and/or resources.

This disclosure is directed to use of tags in an access management service, where the tags may be used in decisions regarding access of computing resources ("resources") by principals (e.g., users, roles, etc.). The tags may also be used (e.g., queried, etc.) to determine cost information, for grouping resources and/or principals, and for other reasons discussed below. The tags may be assigned to principals, to resources, or both. The resource may be a data storage resource, a database, a compute resource, a streaming resource, and/or a virtual or remote desktop or device, and/or any other type of computing resource.

Tags may be metadata, which may include a key-value pair. For example, a tag may be "project" and a value associated with the tag may be "green". The tag may have other values for different projects, such as "yellow," "orange," and "purple". In some instances, a wildcard value, "*", may be used to represent all values of a tag. In various embodiments, a tag may exist without a value. However, tags typically include values as a key-value pair. Other rules may be implemented for tags, such as a principal may not have a same tag with two different values. Tags may include email addresses, cost centers, project identifiers, location, team name, etc. The value may be a number, letters, symbols, other characters, or a combination of both. In some embodiments, the values may be limited to certain numbers or bytes, and some numbers and/or letter combinations may be excluded for special use.

Tags may be used to define access privileges of principals and/or roles of the principals. As an example, a principal may have a cost center tag with a value 1234 ("CostCenter": 1234). A particular resource, such as a data storage location may have an access requirement that requires principals to have the tag/value "CostCenter":1234 in order to gain access to the data in the data storage. Thus, a principal must have both the tag ("CostCenter") and the value of this tag (1234) to gain access. A principal that does not have this tag, or has the tag, but has a different value (e.g., 4567), would be denied access. Other tag conditions may be used to determine access, as discussed below in various examples.

Tags may be granted to principals by administrators or other authorized principals, possibly in accordance with tagging policies. For example, an administrator may create a new principal and add tags to that new principal. An administrator may also remove tags, modify tags or tag values, and/or add tags to an existing principal. In some embodiments, a principal may assume a role, and may be provided tags for the role on a temporary or permanent basis. For example, a principal may be placed on a project for a short period of time and may require access for that project, via a new role, for that time period.

Tags may be granted to resources by principals, administrators, and/or creators of the resources, depending on requirements for these tags. The tags of resources may be the same or similar to the tags of the principals. For instance, a data storage may include a tag of "CostCenter":1234. In some embodiments, a resource that is created may be automatically tagged with one or more tags based on tags of a creator of the resource, sometimes referred to as "painting" of tags. By adding tags to resources in this way, a creator may easily group resources and costs of those resource may be easily attributed to a principal (e.g., having the same tag as the resource).

An access management system may deploy an access management service to create and use tags in these ways described above and in many other ways (some of which are described below) to control access to resource, to group principals and/or resources, and/or for other reasons.

The techniques and systems described herein may be implemented in a number of ways. Example implementations are provided below with reference to the following figures.

FIG. 1 is a block diagram of an illustrative environment 100 that includes an access management system (AMS) 102 configured to create and use access management tags for users (also referred to herein as "principal(s)") and/or resources. The AMS 102 may deploy an access management service 104 (hereinafter "service"). The service 104 may create tags, modify tags, remove tags, and/or use tags to determine access privileges and/or other information. The service implements attribute based access control based at least in part on tags of the users and/or the resources, rather than using identity access control that relies on access control lists for specific resources (e.g., a whitelist of user identifiers for a particular resource). By using tags, administrators and possibly other users can easily manage access to resources by creating or changing tags or tag conditions of the resources, and/or adding, removing, or changing tags of users.

The AMS 102 may include or have access to user profiles 106 and/or resource profiles 108, which may include tags. A user profile 106 may store or otherwise be associated with information about a user, whereas a resource profile may store or otherwise be associated with information about a resource. Thus, tags may be assigned to users, to resources, or both. Tags may be metadata, which may include a key-value pair. For example, a tag may be "project" and a value associated with the tag may be "green" or "1000" (among other possible values, possibly with some limitations). The tag may have other values for different projects, such as "yellow," "orange," and "purple". In some instances, a wildcard value, "*", may be used to represent all values of a tag, which may be used in queries or access controls, etc. In various embodiments, a tag may exist without a value. However, tags typically include values as a key-value pair. Other rules may be implemented for tags, such as a user may not have a same tag with two different values. Tags may include email addresses, cost centers, project identifiers, location, team name, etc. The value may be a number, letters, symbols, other characters, or a combination of both. In some embodiments, the values may be limited to certain numbers or bytes, and some numbers, letter combinations, symbols, and/or character combinations may be excluded for special use. For the purpose of this discussion the term "user" may be substituted with the term "role," and tags may be associated with the role. In the context of a role, the tag may be referred to herein as a "role tag." Moreover, in some embodiments, the term "principal" may be representative of a user or a role, and a tag associated with the principal may be referred to herein as a "principal tag." In certain embodiments, a role may include a predefined set of tags. For instance, a role may be of a certain type of employee that has certain tags that lead to respective privileges (e.g., access abilities, etc.).

The AMS 102 may enable or authorize access by user device 110(1)-(N) (e.g., desktop computers, laptop computers, mobile telephones, tablet computing devices, game consoles, electronic book (eBook) reader devices, etc.) associated with respective users 112(1)-(N) to computing resources 114(1)-(M) (e.g., server computers, etc.; hereinafter "resources"), via one or more networks 116, such as wired and/or wireless networks. The users 112(1)-(N) may be associated with tags and tag values, which may be stored and retrieved from the user profiles 106. Likewise, the resources 114(1)-(M) may be associated with tags and tag values, which may be stored and retrieved from the resource profiles 106. In some embodiments, the resource profiles 106 may include access rules for accessing the resource, which may require certain tags to be associated with users to allow those users to access the resource. The tags required of a user to access a resource may be the same tags as the resource or different tags, depending on the access rules for a given resource, for example.

In the example shown in FIG. 1, a first user 112(1) may include a tag/value pair of "Project":Green and "CostCenter":123. A second user 112(2) may include a tag/value pair of "Project":Green and "CostCenter":456. A last user 112(N) may include a tag/value pair of "Project":Red and "CostCenter":789. Although the tag/value pair of "Project" and "CostCenter" is referenced in the embodiment illustrated in FIG. 1, the term "value" is depicted in FIG. 1. A first resource 114(1) may include a tag/value pair of "Project": "*" and "CostCenter":123, where "*" is a wildcard and represents all projects. Here, this wildcard may be used as a condition for access, but not as an actual tag in some instances since a tag may not be allowed to have more than one value. A second resource 114(2) may include a tag/value pair of "Project":Green and "CostCenter":"*". A last resource 114(2) may include a tag/value pair of "Project": Red and "CostCenter":789.

The AMS 102 may deploy the service 104 to determine which users may access which of the resources based on tags of the user and/or tags or tag conditions of the resources. A tag condition may be different than a tag. For example, a resource may have a tag "Project":Green, but a tag condition of "Project":"*", which requires a user to have a project tag, but no specific tag value for that project tag.

In the example shown in FIG. 1, the service 104 may allow the first user 112(1) to access the first resource 114(1) since the first user includes a "project" tag and includes a "CostCenter" tag having a tag value of 123, as shown in the tag conditions associated with the first resource 114(1). The service 104 may allow the first user 112(1) to also access the second resource 114(2) since the first user includes a "project" tag with the value "Green" and includes a "CostCenter" tag, as shown in the tag conditions associated with the second resource 114(2). The service may deny access by the first user to the last resource 114(M) since the first user 112(1) does not have the "Project" tag value of "Red", but instead has a "Project" tag value of "Green".

Continuing with the example shown in FIG. 1, the service 104 may allow the second user 112(2) to access the second resource 114(2) since the second user includes a "project" tag value of "Green" and includes a "CostCenter" tag. The service may deny access by the second user to the first resource 114(1) and the last resource 114(M) since the second user 112(2) does not have the "CostCenter" tag value of "123", and because the second user 112(2) does not have the "Project" tag value of "Red", respectively.

Continuing with the example shown in FIG. 1, the service 104 may allow the last user 112(3) to access the last resource 114(M) since the last user includes a "project" tag value of "Red" and includes a "CostCenter" tag value of 789. The service may deny access by the last user to the first resource 114(1) and the second resource 114(2) since the last user 112(N) does not have the "CostCenter" tag value of "123", and because the last user 112(N) does not have the "Project" tag value of "Green", respectively. Accordingly, and as illustrated in FIG. 1, a single user 112 or corresponding user device 110 may be authorized to access a single resource 114, a single user 112/user device 110 may be authorized to access multiple resources 114, and/or multiple users 112/user devices 110 may be authorized to access a single resource 114.

As discussed above, user tags 118 may be granted to users by administrators or other authorized users. For example, an administrator may create a new user and add tags to that new user. An administrator may also remove tags, modify tags or tag values, and/or add tags to an existing user. In some embodiments, a user may assume a role, and may be provided tags for the role on a temporary or permanent basis. For example, a user may be placed on a project for a short time and may require access for that project, via a new role, for that time period.

Resource tags 120 may be granted to resources by users, administrators, and/or creators of the resources, depending on requirements for these tags. The tags of resources may be the same or similar to the tags of the users. For instance, a data storage may include a tag of "CostCenter":1234. In some embodiments, a resource that is created may be automatically tagged with one or more tags based on tags of a creator of the resource, sometimes referred to as "painting" of tags. By adding tags to resources in this way, a creator may easily group resources and costs of those resource may be easily attributed to a user (e.g., having the same tag as the resource).

Although the examples herein describe resources to have tags, this is not required. The techniques and systems may be performed where users have tags, and resources include tag conditions, as described below. The resources do not need to have tags to create tag conditions. However, when resources have tags, those tags may be used when determining access in some embodiments.

Moreover, although a comparison of the user tags 118 and the resource tags 120 to determine whether a user 112 is authorized to access a resource 114 is discussed with respect to FIG. 1, other embodiments are contemplated herein. For instance, a user 112 that is associated with a particular user tag 118 may be authorized to access one or more resources 114 regardless of the resource tag(s) 120 associated with those resource(s) 114. That is, upon receiving a request for a user 112 to access a particular resource 114, the access management system 102 and/or the access management service 104 may determine whether access to the resource 114 by the user 112 is authorized based on just the user tag 118 of the user 112, and without considering the resource tag 120 associated with that resource 114. Upon receiving a user request to access the resource 114, the service 104 may identify the user tag 118 of the user 112, compare the user tag 118 to stored tags that are authorized to access the resource 114, and then fulfill the request by allowing the user 112 to access the resource 114 (or access, modify, and/or delete data/information associated with the resource 114). In some embodiments, all users 112 that have a particular user tag 118 are authorized to access a set of resources 114, which may include a single resource 114 or multiple resources 114. As an illustrative example, based on a request for user 112(1) to access resource 114(1), the access management system 102 and/or the access management service 104 may determine whether access is authorized based solely on the user tag 118 of that user 112(1) (project green and/or value 123), regardless of the resource tag 120 associated with resource 114(1) (project * and/or value 123).

Figure 2:
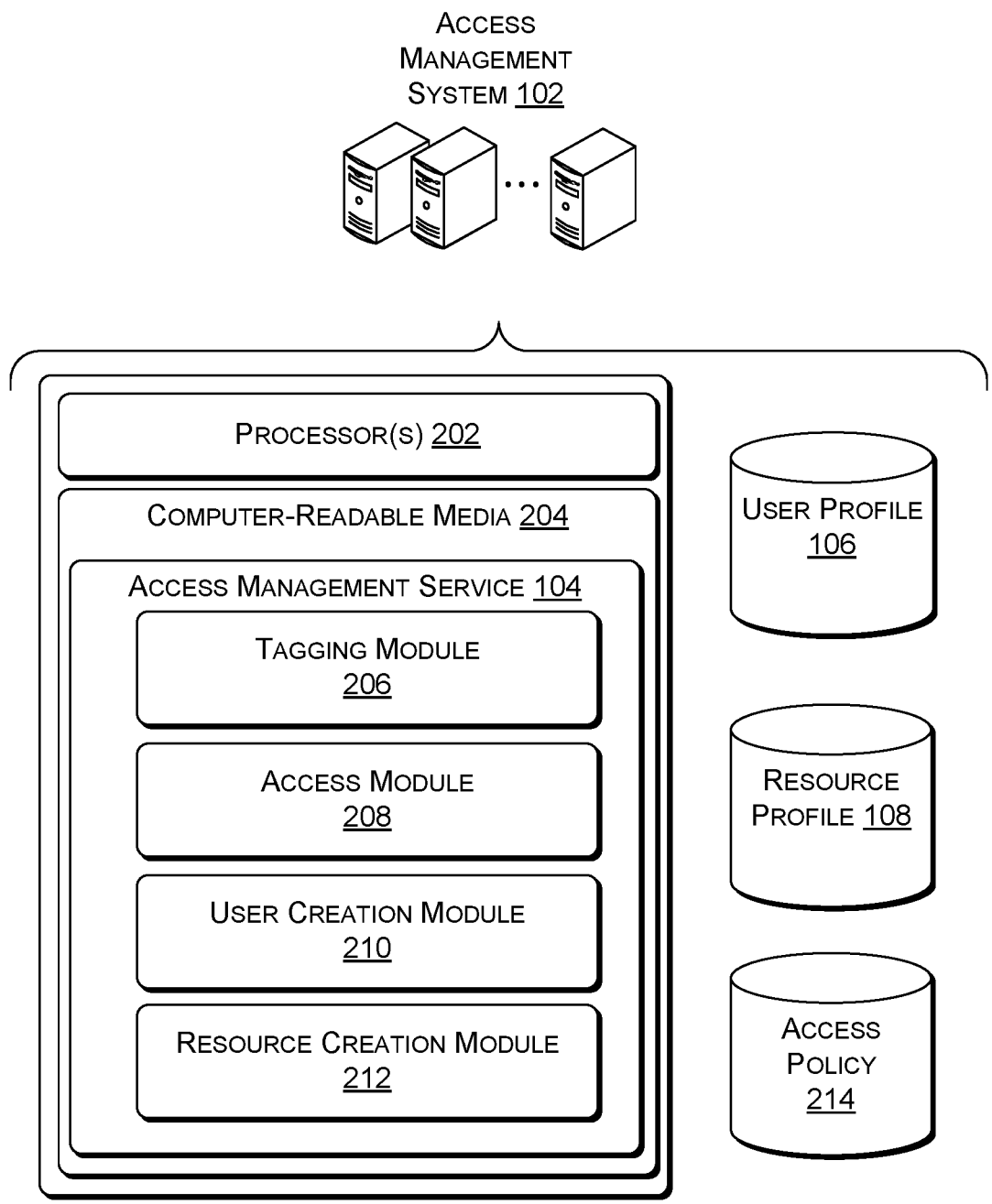
FIG. 2 is a block diagram of an illustrative computing architecture of the access management system shown in FIG. 1.

FIG. 2 is a block diagram of an illustrative computing architecture of the access management system shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store the service 104. The service 104 may include a tagging module 206, an access module 208, a user creation module 210, and/or a resource creation module 212, which are described in turn. The modules may be stored together or in a distributed arrangement. The computing architecture may include or have access to the user profiles 106, the resource profiles 108 and/or access policies 214.

The tagging module 206 may enable creation, modification, and/or removal of tags to users and/or resources. For example, the tagging module 206 may enable an administrator or a different individual to create tags for a user, which may be stored in the user profile 106 of the user. The tagging module 106 may enable adding a role to a user, such as using a "AssumeRole" command to give a user specific tags on a temporary or permanent basis. The tagging module 106 may enable adding tags to resources, which may be stored in the resource profile 108. For example, an authorized user (e.g., admin, creator, etc.) may add, modify, or remove tags from a particular resource. In some embodiments, the tagging module 206 may automatically add tags, or "paint" tags, to a resource based on tags of a creator of the resource. For example, if a user has a tag of "CostCenter":123 and creates a new resource, the new resource may include the tag "CostCenter":123, which may enable grouping the resources with the creator and determining costs associated with the user for the key-value pair of "CostCenter":123.

In some embodiments, principals (e.g., users or roles) may be grouped based on the principal tags (e.g., user tags or role tags) and resources may be grouped based on resource tags. For instance, principals having the same (or similar) principal tag may be grouped together, and such a group may represent that principals within that group have certain access privileges with respect to different resources. On the other hand, resources having the same (or similar) resource tags may be grouped together, and such a group may represent resources in which individual principals or a group of similarly situated principals are authorized to access.

The access module 208 may implement, at least in part, one or more of the access policies 214. For example, an access policy may allow or deny a user access to a resource based at least in part on tags of the user, tags of the resource, or both. For example, a policy may include tags required to access a particular resource, which must be held by a user to access that resource. Another policy may require the user and the resource to have certain matching tags in order for the user to access the resource. For example, only individuals having a particular role may be authorized to access a resource, and those individuals may be associated with one or more tags that allow the individuals to access the resource. The same or different tags may also allow individuals to modify or delete that resource, of a different resource. Other policies that are based on the tags of the user and/or the resource may be specified in the access policies 214 and implemented/enforced by the access module 208.

The user creation module 210 may enable creation of a user. For example, an administrator may create a new user, which may correspond to a digital representation of an individual. In some embodiments, the new user may assume a role. For the purposes of this discussion, a role may correspond to a position of the user or function to be performed by a user, such as user's role with respect to an employer (e.g., administrative, information technology, officer, executive, full-time employee, part-time employee, contractor, etc.). The user creation module 210 may determine tags to add to the new user, which may be applied by the tagging module 206.

The resource creation module 212 may enable creation of a new resource. Creation may include deployment and/or redeployment of existing resources. For example, a user (creator) may create a new resource. The resource creation module 212 may determine tags to add to the new resource, which may be applied by the tagging module 206. In some embodiments, certain tags of a creator of the resource may be applied to (e.g., "painted" to) the resource. This may provide automatic tagging of some new resources, which may enable tracking resources for cost or other accounting purposes, as well as proving access control over the new resources. For the purpose of this discussion, a resource may correspond to any physical or virtual component of limited availability within a computer system. In some instances, each device connected to a computer system is a resource and/or each internal system component is a resource. Moreover, a service and/or entity different from the access management system 102 and/or the access management service 104 (e.g., a third-party service, a third-party entity, etc.) may create, or provide access to, one or more resources that are accessible to users.

FIGS. 3-7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
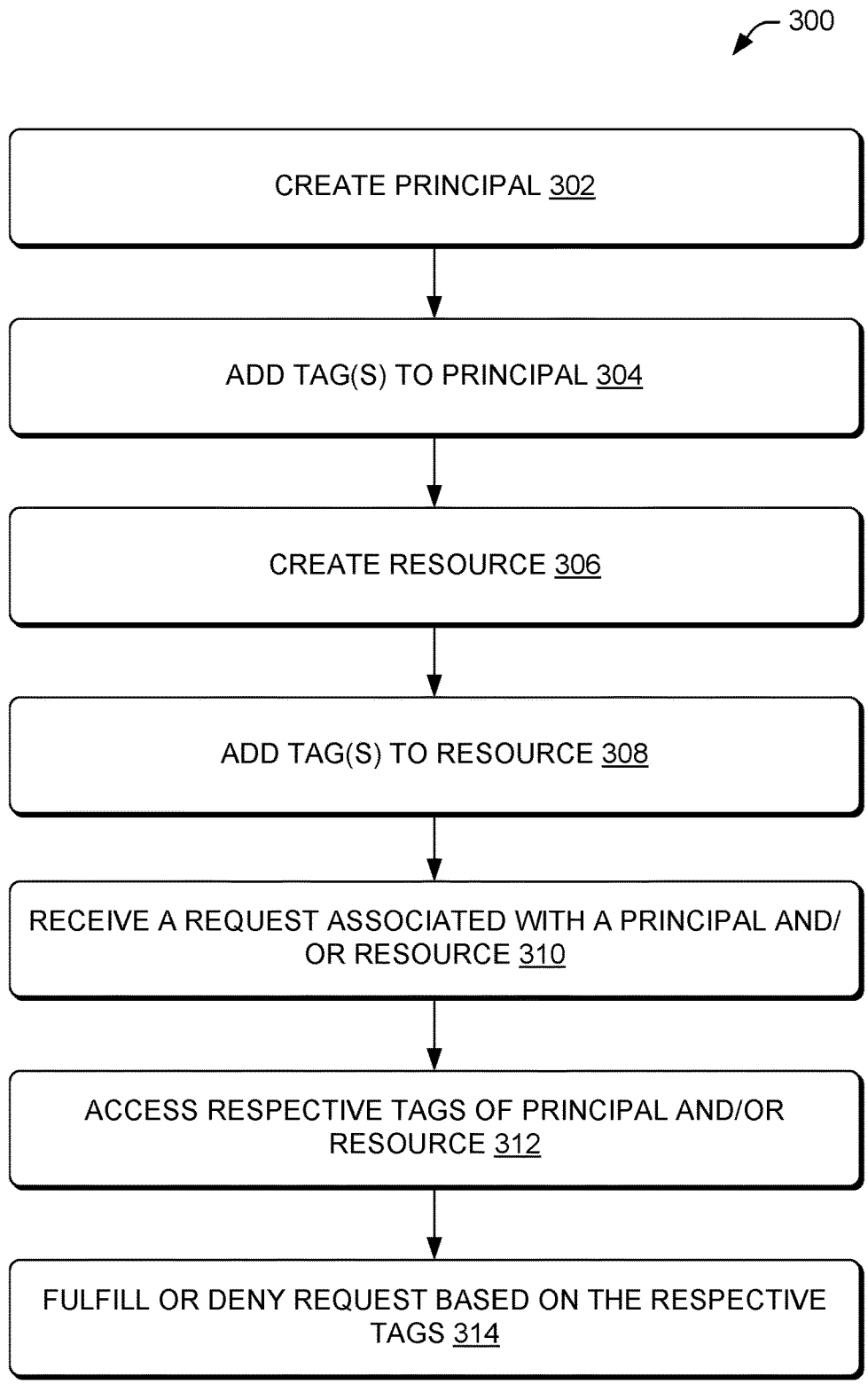
FIG. 3 is a flow diagram of an illustrative process to create tags for users and resources and use the tags in response to requests by users associated with resources.

FIG. 3 is a flow diagram of an illustrative process 300 to create tags for principals and resources and use the tags in response to requests by principals associated with resources. The process 300 is described with reference to the environment 100 and the computing architecture 200 and may be performed by the access management service 104. Of course, the process 300 may be performed in other similar and/or different environments.

At 302, the service 104 may create a principal. For example, the service 104 may use the user creation module 210 to create a new principal (e.g., a new user, a new role, etc.). The principal may be associated with a principal profile that includes or stores information about the principal, such as demographic information, one or more roles of the principal, one or more tags previously associated with the principal, permissions of the principal, and so on.

At 304, the service 104 may add one or more tags to the principal created at the operation 302. The tag may include a value, and thus be a key-value pair such as "Project":Green or "CostCenter":1234. Moreover, the added tag(s) may be associated with the principal, such as by storing the tag(s) in the principal profile of the principal.

At 306, the service 104 may create a resource. For example, the service 104 may use the resource creation module 212 to create the new resource. The new resource may also be an existing resource, and may correspond to memory or storage space within one or more computing devices (e.g., servers), files stored in memory, network connections, and so on.

At 308, the service may add one or more tags to the resource created at the operation 306. The tag may include a value, and thus be a key-value pair such as "Project":Green or "CostCenter":1234.

At 310, the service 104 may receive a request associated with a principal and/or a resource. The request may be a request by a principal to access, modify, and/or delete an existing resource, or a request from a principal to create a new resource. The request may also be a request to list principals and/or resources having certain tags. Of course, other request may be performed that leverage the tags of the principals and/or the resources.

At 312, the service 104 may access respective tags of the principal and/or the resource. For example, the service 104 may access the respective tags in accordance with conditions of the request, such as an access policy or other conditions (e.g., query parameters, etc.).

At 314, the service 104 may fulfill or deny the request based on the respective tags. For example, the service 104 may grant access, deny access, provide tagged results, deny providing tagged results, and/or provide other access or denials based on the respective tags. As an example, a principal with a certain tag may only query other principals with the same tag. Thus, when a principal without this tag queries user with the certain tag, the query request may be denied. In an additional example, assume that the request was a request from a principal to access a particular resource. The service 104 may identify the tag(s) of the principal and the tag(s) of the resource to determine if any of the tag(s) match. If so, the principal may be provided access to the resource. Otherwise, access to the resource by the principal may be denied. In different embodiments, instead of comparing the principal tags of the principal and the resource tags of the resource, the service 104 may identify just the principal tag associated with the principal to determine if the principal is authorized to access the resource.

Provided that access to the resource is denied, the service 104 may identify one or more different resources in which the principal is authorized to access. Such different resources may store, or otherwise be associated with, data/information that is the same as, or is similar to, the data/information of the resource in which access was denied. Upon notifying the user that access is denied, the service 104 may identify the additional resources and possibly indicate or recommend that the additional resources may be of interest to the principal based on the initial request. The additional resources may be associated with resource tags that are the same as, or are similar to, the resource tags of the resource in which access was denied. Accordingly, the service 104 may identify the resource tag(s) of the requested resource and use those resource tag(s) to identify other resources that have the same, or similar, resource tags. In some embodiments, the additional resources may include data/information that is the same as, or is similar to, the data/information requested in the initial request.

Figure 4:
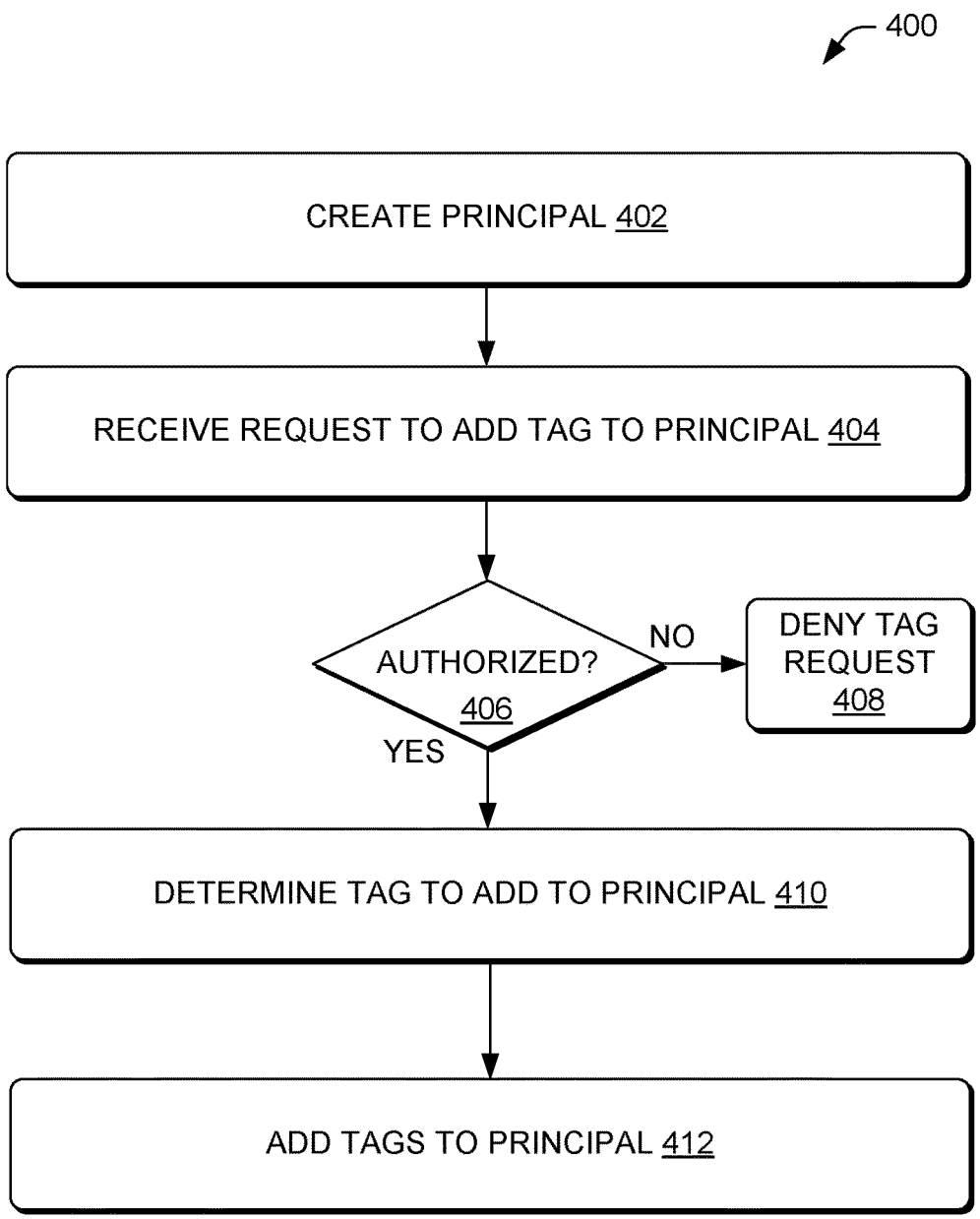
FIG. 4 is a flow diagram of an illustrative process to create tags for users.

FIG. 4 is a flow diagram of an illustrative process 400 to create tags for principals. The process 400 is described with reference to the environment 100 and the computing architecture 200 and may be performed by the access management service 104. Of course, the process 400 may be performed in other similar and/or different environments.

At 402, the service 104 may create a principal. For example, the service 104 may use the user creation module 210 to create the new principal (e.g., new user, new role, etc.), where the new principal may correspond to a digital representation of the principal or a principal profile associated with the principal. In other embodiments, the service 104 need not create the principal, and the request illustrated in 404 may correspond to a previously created, or an already existing, principal. Accordingly, if the principal has previously been created, step 402 may not occur and step 404 may be the first step in the process 400.

At 404, the service 104 may receive a request to add a tag to a principal. The request may be for a new tag, but may also be to modify a tag value, remove a tag, or take other actions with tags that were previously associated with the principal.

At 406, the service 104 may determine whether the request is authorized. For example, the service 104 may enforce a policy that restricts which principals can add tags or otherwise modify tags for certain principals, for certain tags, and so forth.

When the request is not authorized (following the "no" route from the decision operation 404), then the process 400 may advance to an operation 408. At 408, the request may be denied. For example, the service 104 may reject addition of a tag to a certain user, and a corresponding notification may be sent or presented to the principal that submitted the request to add the tag.

When the request is authorized (following the "yes" route from the decision operation 404), then the process 400 may advance to a decision operation 410.

At 410, the service 104 may determine one or more tags for the principal to add to the principal profile of the principal. The tags may include tag values in accordance with a tagging policy. For example, the tag values may be constrained to certain input types, etc.

At 412, the service 104 may add the tags to the principal, such as by adding the tags to a principal profile (or a role profile or a user profile) of the principal (or a role or a user).

The tags may be stored in the user profile 106 (or principal profile) associated with the user (or principal), and capable of recall or access by the service 104 for certain operations, such as in response to a request as described in the process 300 above.

In some embodiments, provided that the principal is, or is associated with, a role, a time duration of the role or other conditions may be determined (e.g., expiration of the role, triggering event, etc.), which may determine a termination of the role. The role may be associated with predetermined tag(s).

Figure 5:
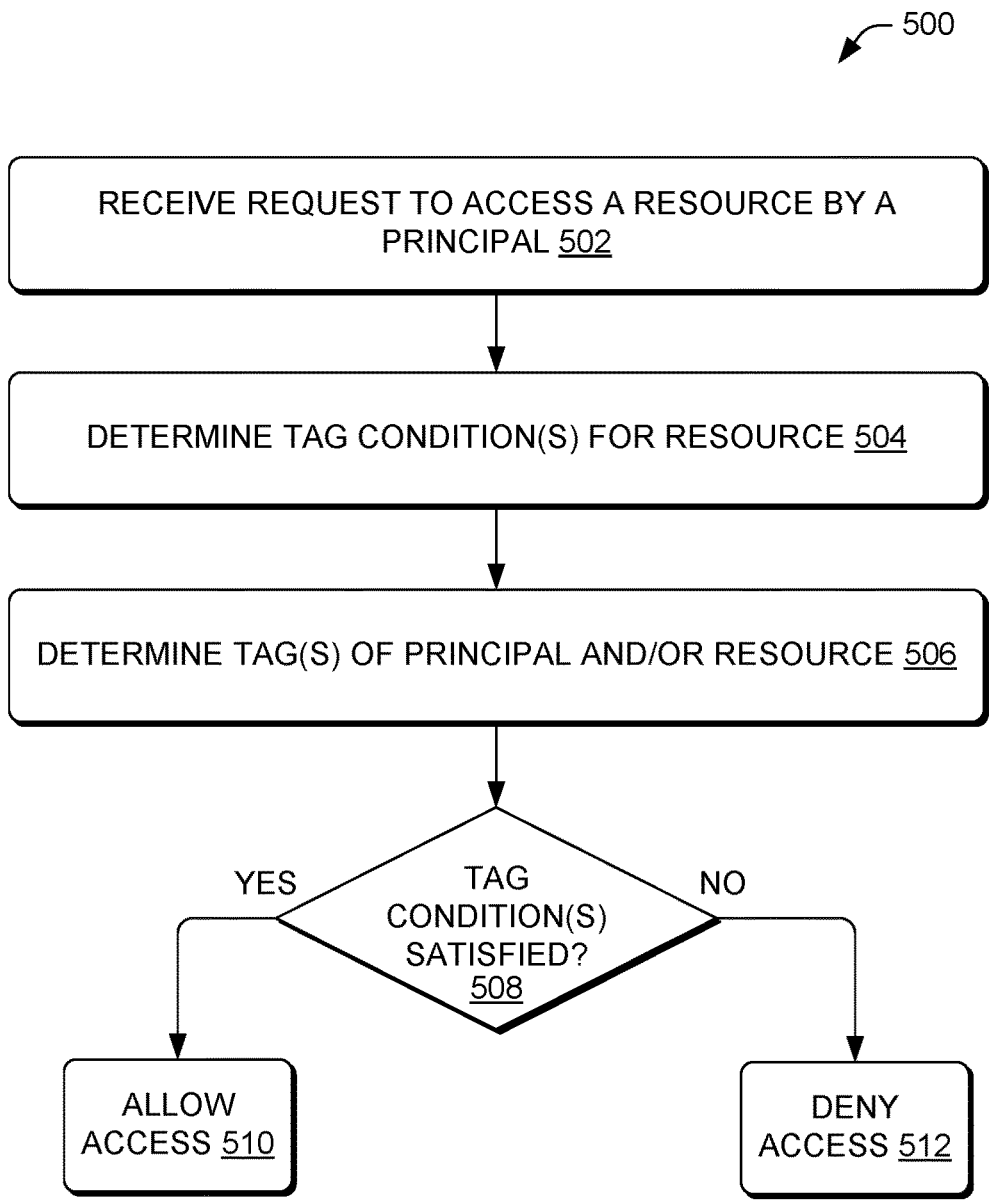
FIG. 5 is a flow diagram of an illustrative process to fulfill access requests for resources using tags of a user and tag condition(s) of a resource.

FIG. 5 is a flow diagram of an illustrative process 500 to fulfill access requests for resources using tags of a user and tag condition(s) of a resource. The process 500 is described with reference to the environment 100 and the computing architecture 200 and may be performed by the access management service 104. Of course, the process 500 may be performed in other similar and/or different environments.

At 502, the service 104 may receive a request to access a resource. The request may be received from a principal (e.g., a user, a role, etc.) via a device (e.g., a user device). For example, a principal may desire to access a data in a storage device or a file stored in a remote computing device (e.g., a server).

At 504, the service 104 may determine tag condition(s) associated with the resource. For example, the tag condition or conditions may include certain tags that are required of the user to gain access. In some embodiments, the tag condition(s) may include the user having certain tags that are also held by the resource. For example, a resource may have a tag and value of "Project":Green. Only users with this same tag could access the resource if a requirement were made/enforced to have matching tags between the user and resource. In some embodiments, the tag condition may be to have some tags match, but possibly not all. An example condition may be that the "Project" tag must match, but not a "CostCenter" tag, when the resource include both of these tags. In various embodiments, the resource may include a described tag condition (tag permission) that is different than the tags of the resource. Using the tag permission, the tags may include wildcards (allows all users having the tag regardless of the tag value held by the user) and/or tags with multiple different values (e.g., "Project":Green and Red), or negative restrictions (e.g., Not "Project":Pink, etc.). Of course, other tag condition(s) may be contemplated, including combining two or more different conditions discussed herein.

At 506, the service 104 may determine tags of the principal and/or resource. The tags may be used to determine whether to allow or deny access per a decision operation 508. In some embodiments, the operations associated with step 504 and step 506 may occur in reverse order, such that the service 104 may first determine tags of the principal and/or the resource and then the service 104 may determine tag conditions associated with the resource.

At 508, the service 104 may apply the tag condition(s) using the tags determined at the operation 506 to determine whether to allow or deny access to the resource. When the tags of the principal and/or resource satisfy the tag condition(s) (following the "yes" route from the decision operation 508), then the process 500 may advance to an operation 510. At 510, the service 104 may allow the principal to access the resource.

When the tags of the user and/or resource do not satisfy the tag condition(s) (following the "no" route from the decision operation 508), then the process 500 may advance to an operation 512. At 512, the service 104 may deny the principal access to the resource.

Figure 6:
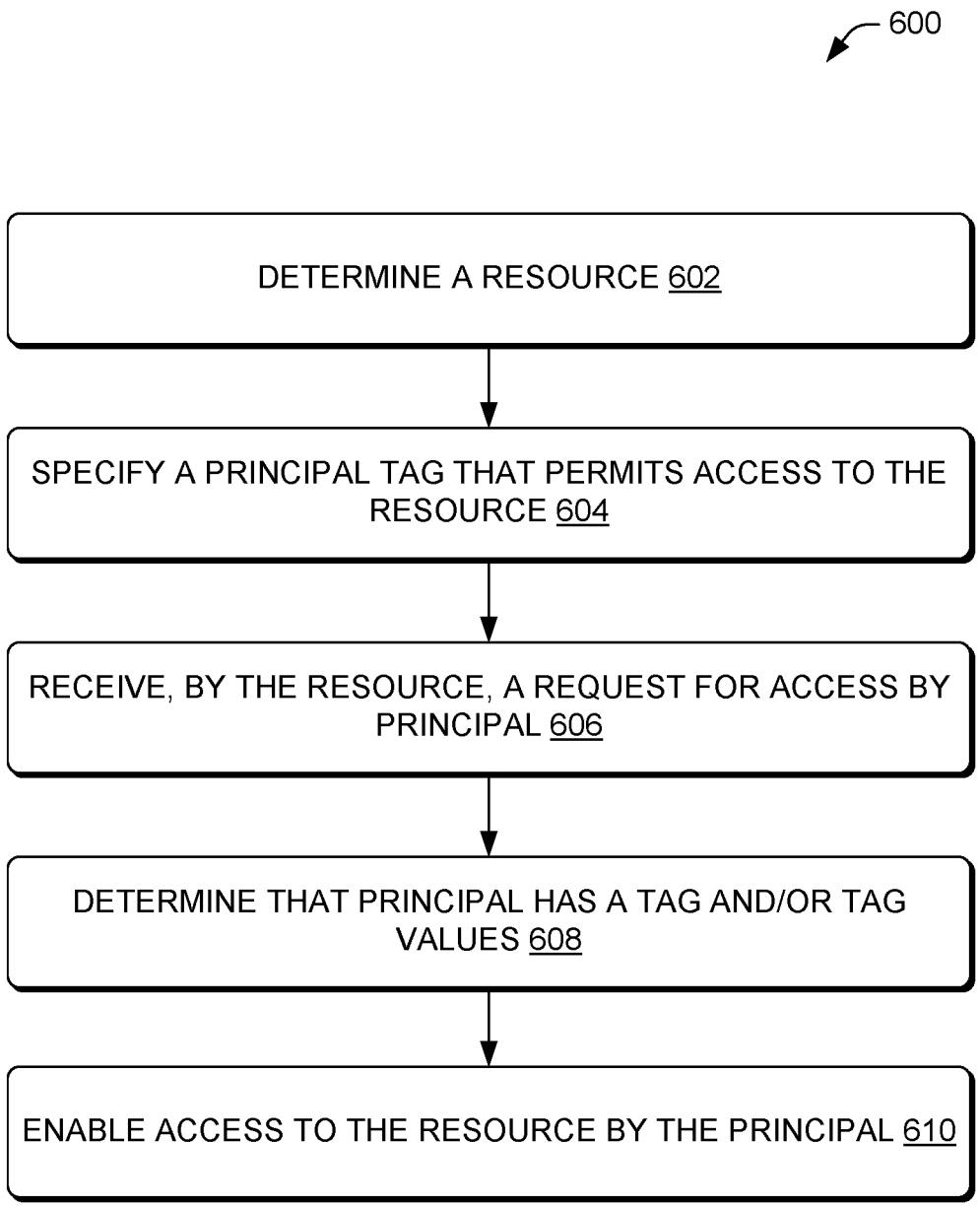
FIG. 6 is a flow diagram of an illustrative process to specify user tags to allow access to a resource.

FIG. 6 is a flow diagram of an illustrative process 600 to specify user tags to allow access to a resource. The process 600 is described with reference to the environment 100 and the computing architecture 200 and may be performed by the access management service 104. Of course, the process 600 may be performed in other similar and/or different environments.

At 602, the service 104 may determine a resource to designate an access requirement or condition. For example, the resource may be a data storage resource, a database, a computing resource, a streaming resource, and/or a virtual or remote desktop or device, and/or any other type of computing resource.

At 604, the service may specify a principal tag that permits access to the resource. For example, a tag condition may be expressed as a tag permission of "CostCenter":"*", which would require a user to have the "CostCenter" tag, but would not any specific value. However, the tag condition could specify multiple tag values or a single required tag value, such as "CostCenter":"2345". In certain embodiments, the principal tag may be a user tag associated with a user or a role tag associated with a role.

At 606, the service may receive a request for access by a principal to a resource. The request may come from the resource, that may communicate the request to the service for authorization. Some embodiments, all requests or certain requests may be routed to the service 104, and then to the resource, such as when the user is permitted. In various embodiments, the principal (e.g., the user, the role, etc.) may be given a token or other certificate to access the resource after determining that an access condition is satisfied. The access may expire after usage and/or a predetermined duration of time. In some embodiments, the predetermined duration of time may of any duration (e.g., 30 minutes, 24 hours, one week, one month, one year, etc.) be determined by the administrator or some other entity.

At 608, the service may determine that the principal has one or more tags and/or tag values required by the tag conditions (tag permissions). For example, when the tag condition is for a tag "CostCenter":"*", and the principal has a tag and tag value of "CostCenter":"1234", then the service 104 would determine that the principal has the tag.

At 610, the service 104 may enable access to the resource by the principal. For example, the service 104 may communicate with the resource to cause the resource to provide access. In some embodiments, the service 104 may provide a token or other credentials to the principal and/or resource to permit access to the resource by the principal for a predetermined usage amount and/or a predetermined duration of time.

Figure 7:
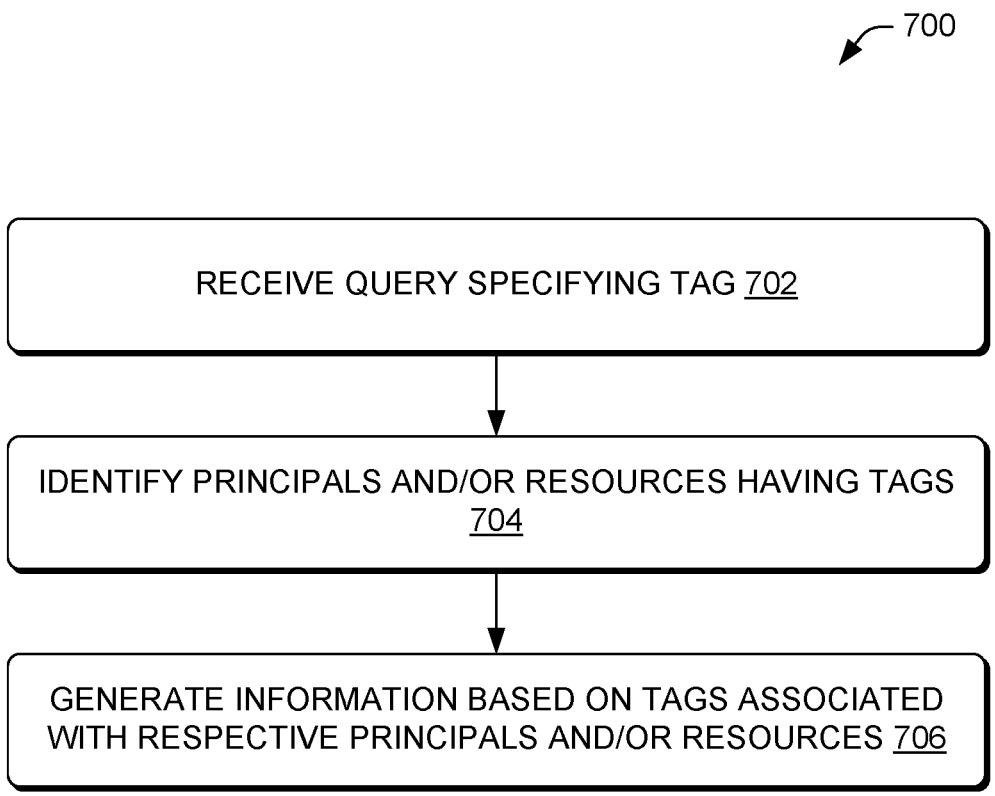
FIG. 7 is a flow diagram of an illustrative process to query tags to determine access and/or usage information based on tags.

FIG. 7 is a flow diagram of an illustrative process 700 to query tags to determine access and/or usage information based on tags. The process 700 is described with reference to the environment 100 and the computing architecture 200 and may be performed by the access management service 104. Of course, the process 700 may be performed in other similar and/or different environments.

At 702, the service 104 may receive a query or request that specifies a tag. For example, a principal (e.g., a user, a role, etc.) may want to determine all other principals and/or resources that have a certain tag. This may allow the querying principal to determine access information, ownership, cost information, and/or other information about principals and/or resources based at least in part on tags held by principals and resources.

At 704, the service 104 may identify principals and/or resources that have the tags indicated in the operation 702. In some embodiments, the query may include both a specific tag and tag value.

At 706, the service 104 may generate information based on the tags associated with respective principals and/or resources. Thus, the service 104 may provide results of the query, for example. In some embodiment, the operation 706 may be contingent on authorization. For, example, a principal may be denied a request to query information that he/she/it is not privileged to access per an access policy. That access policy may or may not be based on tags held by the principal requesting the query. In some embodiments, the information may be cost information.

Figure 8:
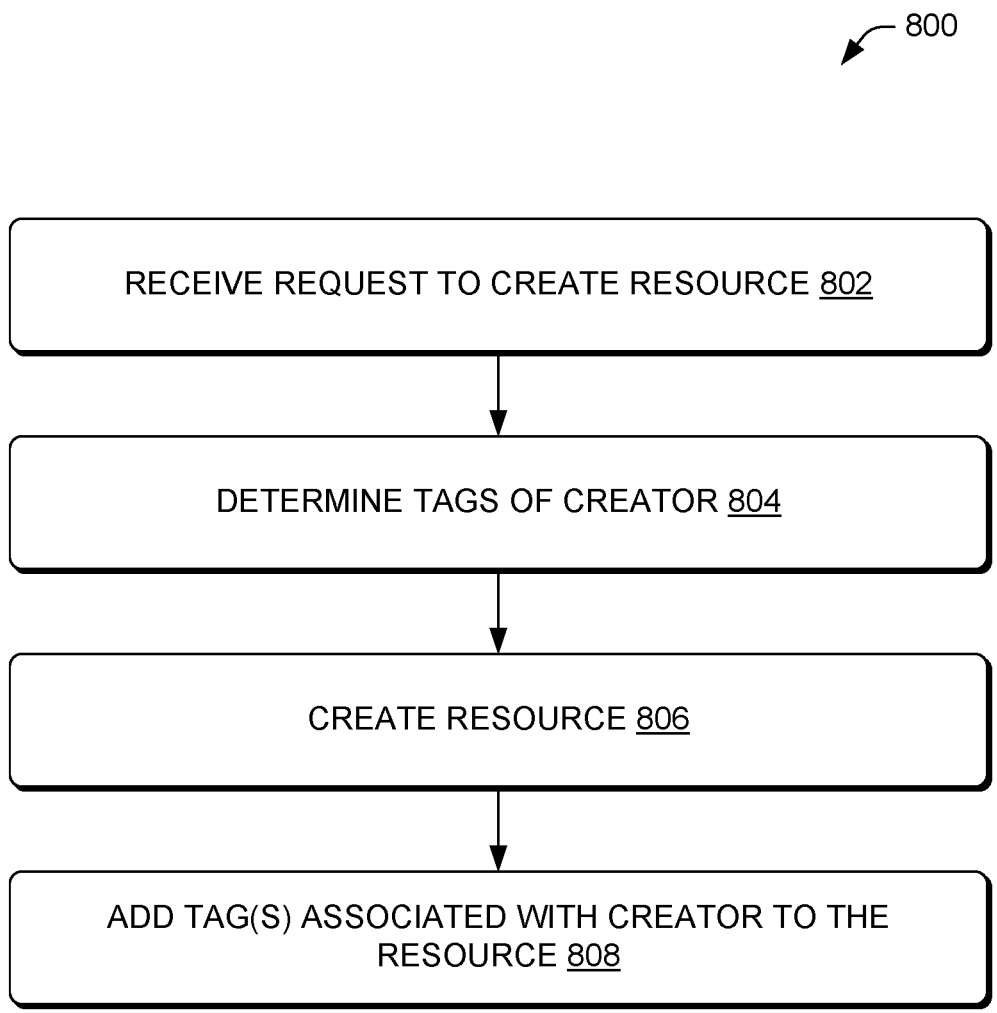
FIG. 8 is a flow diagram of an illustrative process to create tags for a resource.

FIG. 8 is a flow diagram of an illustrative process 800 to create tags for a resource. The process 800 is described with reference to the environment 100 and the computing architecture 200 and may be performed by the access management service. Of course, the process 800 may be performed in other similar and/or different environments.

At 802, the service 104 may receive a request to create a computing resource (resource). For example, a user (creator) may submit a request to create or deploy a new resource or existing resource.

At 804, the service may determine tags of a creator that requests the resource via the operation 802. For example, the creator may have a tag and tag value "Project":Green and a tag and tag value "CostCenter":1234.

At 806, the service 104 may create the resource. For example, the resource creation module 212 may create, deploy, or redeploy a resource based on the request.

At 808, the service 104 may add or otherwise associate one or more tags of the creator (from the operation 804) with the resource, which may effectively "paint" the resource with one or more tags of the user. The service 104 may add the tag(s) automatically without input by the user. By adding these tags, the resources may be attributed or linked to the user. At the same time, in some instances, the user may be given access to the resources due to the matching of tags (or at least some of the tags) between the user and the resource. The tags and tag values may be given to the resource in this operation. In some embodiments, the creator and/or other authorized users may add other tags to the resource.

The following section describes various use cases of tags. In some instances, sample application program interfaces (APIs) are provided to enable a particular use case. The use cases describe, among other things, Request-tags: Tags provided in the request. Customers may desire to specify which tags a user may apply to a resource, modify, or delete from a resource. For example, allow TagUser operation only if the request contains tag "Department=HR", in this case, the tag "Department" is a request tag. Resource-tags: Tags on the resource that is being operated on. Customers may desire to control which tagged resources a user may access. For example, allow GetUser operation on the user only if the user has a Department tag.

Tagging users enables addition to a user or role a key value pair. For example, one can add a tag key 'CostCenter' and value '1234' to a user in an account. One can use tags on users to control access to resources.

There are multiple benefits that result from tagging users (e.g., associating a tag with a user). The tags can be used to make discovering, organizing, and tracking resources easier. For example, if a user adds the tag key 'Project' to a user, one can search for users or roles on a specific project. Another capability is that one can add metadata, such as an email address, for every principal in an account. One can also use tags to organize users by team or project, for example.

There are also multiple ways a user can leverage tags to simplify access management. A user can control access to resources based on tags. For example, rather than granting access to resources by listing the resource names (RN) in the resource block of a policy, a user can grant access to a set of resources by specifying the tag in the condition element of a policy. A user can also simply access management by granting permissions based on tags on users. For example, users tagged with 'JobFunction =Manager' can be granted permissions to put policies on storage buckets or tag users in their cost center.

A user can use the appropriate condition key to control access to resources based on tags. This example grants full access to relation database service (RDS) instances tagged 'CostCenter =1234'.

```
{
    "Version": "2012-10-17",
    "Statement": [
        {
            "Effect": "Allow",
            "Action": ["rds:*"],
            "Resource": "*",
            "Condition": {"StringEquals": [
                {"rds:db-tag/CostCenter": "1234"}]}
        }
    ]
}
```

A user can use the PrincipalTag and PrincipalAccount condition to specify the tag a user requires to get access to the resource. This resource-based policy grants a user access to a storage bucket if the user has the tag, 'Costcenter=1234'. It is important not to use a wildcard in the principal element of the policy without the aws:PrincipalAccount condition as that would grant all users for any account access to the storage bucket if they had the tag.

```
{
    "Version": "2012-10-17",
    "Statement": [
        {
            "Effect": "Allow",
            "Principal": "XYZ":"*",
            "Action":["storage:GetObject"] ,
            "Resource": "arn:xyz:storage:::ProductManagement/*",
            "Condition" : {
            {"StringEquals": [{"xyz:PrincipalTag/CostCenter":
            "1234"},
                {"xyz:PrincipalAccount": "111122223333"
        }}
    ]
}
```

A trust policy may allow any user from the account 123456789012, with the tag "Project=Kombucha", to assume this role. This policy uses the tags on the user to determine if they can assume the role. Once the user assumes the role, only the tags on the role will apply.

```
{
    "Version": "2012-10-17",
        "Statement": {
        "Effect": "Allow",
        "Principal": { "AWS": "arn:xzy:123456789012" },
        "Action": "sts:AssumeRole",
        "Condition": {"StringEquals": {"xyz:PrincipalTag/Project":
        "Kombucha"}}
    }
}
```

Tags on IAM principals also simplify access management in IAM policies and resource-based policies. For example, you can grant Alice access to all resources tagged 'CostCenter=Team'. As another example you can allow users tagged 'Role=Manager' to grant permissions for users tagged with their cost center.

Example Policy which grants access to storage:GetObject API only if the "Project" tag on the storage bucket matches the tag on the IAM principal calling the API:

```
{
    "Version": "2012-10-17",
    "Statement": [
    {
    "Effect": "Allow",
    "Action": "storage:GetObject",
    "Resource": "*",
    "Condition": {
        "StringEquals": {
        "xyz:PrincipalTag/Project':
        ${storage:ExistingObjectTag/Project}"
        }
    }
    }
    ]
}
```

As described herein, users may want to control access to various services and/or resources using tags. The tags may allow users to create, access, modify, delete, etc. services and/or resources. Tags may be provided in a request to access (or modify/delete) a resource and users may desire to specify which tags a user may apply to a resource, which tags the user may modify with respect to the resource, and/or which tags the user may delete from the resource. For instance, a "TagUser" operation may only be allowed if the request contains the tag "Department=HR" and the tag "Department" is a request tag. In other embodiments, the tags may be associated with a particular resource that is being operated on, and users may desire to control which tagged resources a user may access. For instance, a system may allow a "GetUser" operation with respect to a user only if the user is associated with the "Department" tag.

Moreover, the principal tagging systems and processes described herein may solve one or more existing technological problems. For instance, it may be difficult to track or determine which resources were created by a particular identify (e.g., a role or user). "Painting" resources by principal tags in an automated (or partially automated) manner would allow for better tracking of the creation of resources. Further, once resources are automatically "painted" with tags, the tags on the resources can be used for billing and cost allocations in an efficient manner. Users may also be allowed to control access by tags on the identities (or resources). For instance, the systems and processes described herein may allow access to a bucket only if the resource is associated with a certain tag and/or if the tag matches the tag of the resource. In an additional example, a "GetUser" operation on any user may be allowed so long as there is a match between the "Department" tag on the user and the "Department" tag on the calling principal.

The systems and processes described herein generate, maintain, and/or update an infrastructure for the service 104 to facilitate the tagging of users and/or resources. In some embodiments, the service 104 may provide new APIs to tag and untag users and/or roles (e.g., TagUser, TagRole, UntagUser, UntagRole, ListUserTags, ListRoleTags, etc.). In order to facilitate authorization of access to various users, resources, etc. based on user tags and/or resource tags, the authorization techniques associated with the service 104 that treat user and/or role as a resource may be updated to include tags in the resource context. Moreover, in order to facilitate authorization based on the calling principal, Auth Runtime Service (ARS) may populate tags of the calling principal in the principal context. For APIs that may accept/tag tags as input, tags may be added to an action and/or a request in order to support authorization based on request tags.

Accordingly, and as described herein, the systems and/or processes described may allow for the ability to automatically paint resources by the tag of the identity that created the resources for cost allocation and access control, to add tags to principals, to control access to resources based on their associated tags, to control access to APIs based on tag(s) associated with the calling principal, and to control access to APIs based on the tag(s) provided in the request.

The systems, processes, and/or services described herein cause a reduction in costs associated with the access management system 102 and the access management service 104. For instance, as a result of determining whether a principal (e.g., a user, a role, etc.) is authorized to access information/data associated with a computing resource based on a tag associated with the principal and/or a comparison of the tag of the principal and a tag of the computing resource, costs associated with a computing device/server that performs such operations is reduced. Such costs can include a reduction in computing costs and/or improvements of the computing device(s)/server(s) that perform the operations described herein, such as a reduction in processing power/cycles of the computing device(s)/server(s), a reduction in power used by the computing device(s)/server(s), an increase in memory access speed of the computing device(s)/server(s), a reduction in the amount of memory of the computing device(s)/server(s) needed to store data (e.g., data used to determine whether a principal is authorized to access a computing resource, as only the tags need be stored), a reduction in latency associated with processing requests to access resources, a reduction in network bandwidth (e.g., a single request and authorization need only be exchanged between the requesting device and the computing device(s)/server(s)), and so on. Such costs may also include a reduction in monetary costs and/or billing costs associated with requests to access information/data associated with computing resources.

Figure 9:
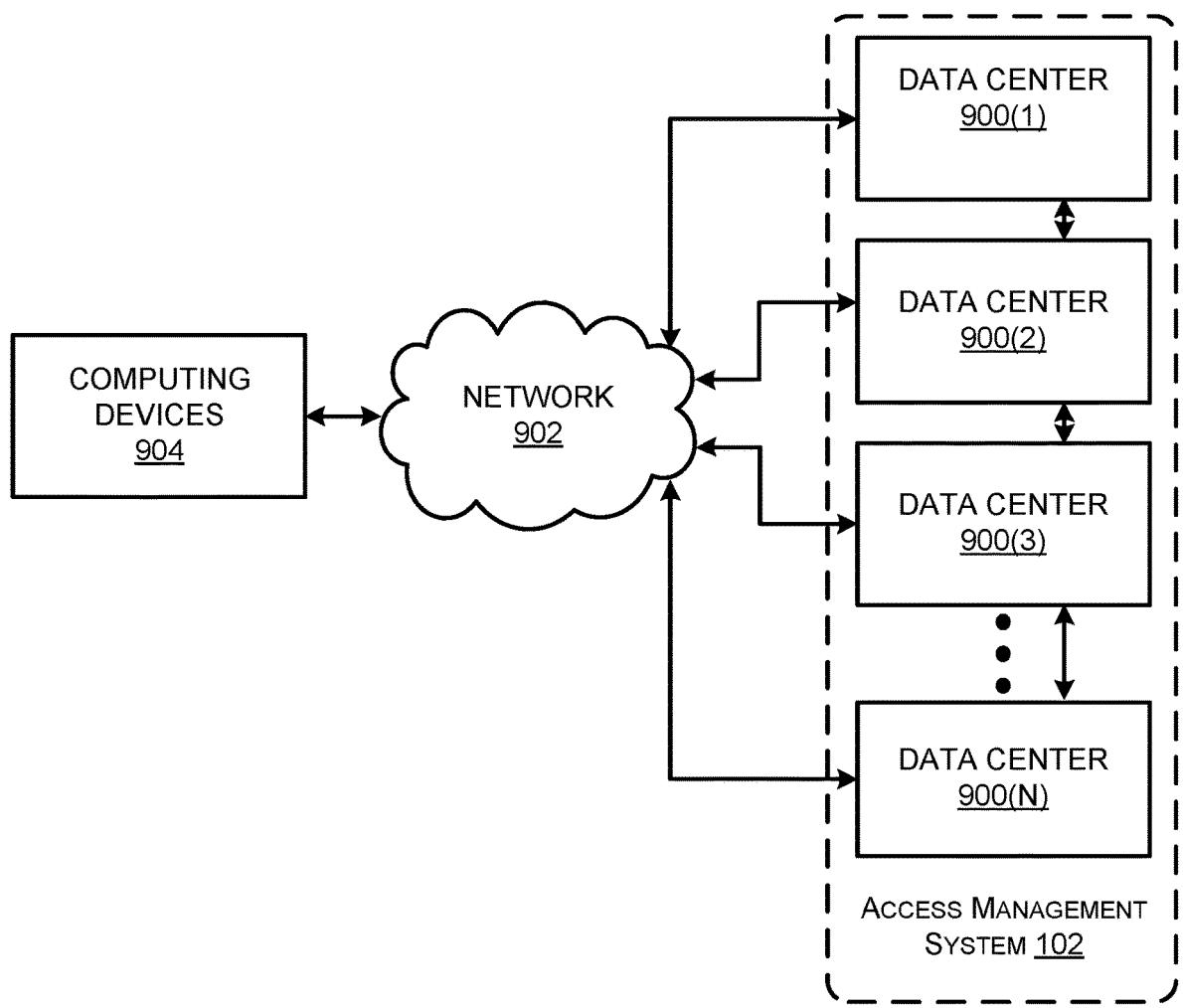
FIG. 9 is a system and network diagram that shows an illustrative operating environment that includes a system that can be configured to implement aspects of the functionality described herein.

FIG. 9 is a system and network diagram that shows an illustrative operating environment that includes an access management system 900 that can be configured to implement aspects of the functionality described herein. As discussed briefly above, the system can execute network services, such as the data storage and data streaming, and/or provide computing resources, such as for the concentrator, on a permanent or an as-needed basis. Among other types of functionality, the computing resources provided by the system, or by a larger system of which the system is a part, can be utilized to implement the various network services described herein. As also discussed above, the system may be part of a larger system that provides the additional computing resources that include, without limitation, data storage resources, data processing resources, such as virtual machine (VM) instances, networking resources, data communication resources, network services, and other types of resources.

Each type of computing resource provided by system, or by a larger system of which the system is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system, or a larger system of which the system is a part, can also be configured to provide other types of computing resources not mentioned specifically herein.

The computing resources provided by system, or a larger system of which the system is a part, are enabled in one implementation by one or more data centers 900(1), 900(2), 900(3), . . . , 900(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 10.

The users of the system can access the computing resources, such as AMS 102, provided by the system over a network 902, which can be a wide area communication network ("WAN"), such as the Internet, an intranet or an Internet service provider ("ISP") network or a combination of such networks. For example, and without limitation, a computing device 904 (e.g., the computing device 104) operated by a user of the system can be utilized to access the system by way of the network 902. It should be appreciated that a local-area network ("LAN"), the Internet, or any other networking topology known in the art that connects the data centers to remote users and other users can be utilized. It should also be appreciated that combinations of such networks can also be utilized.

Figure 10:
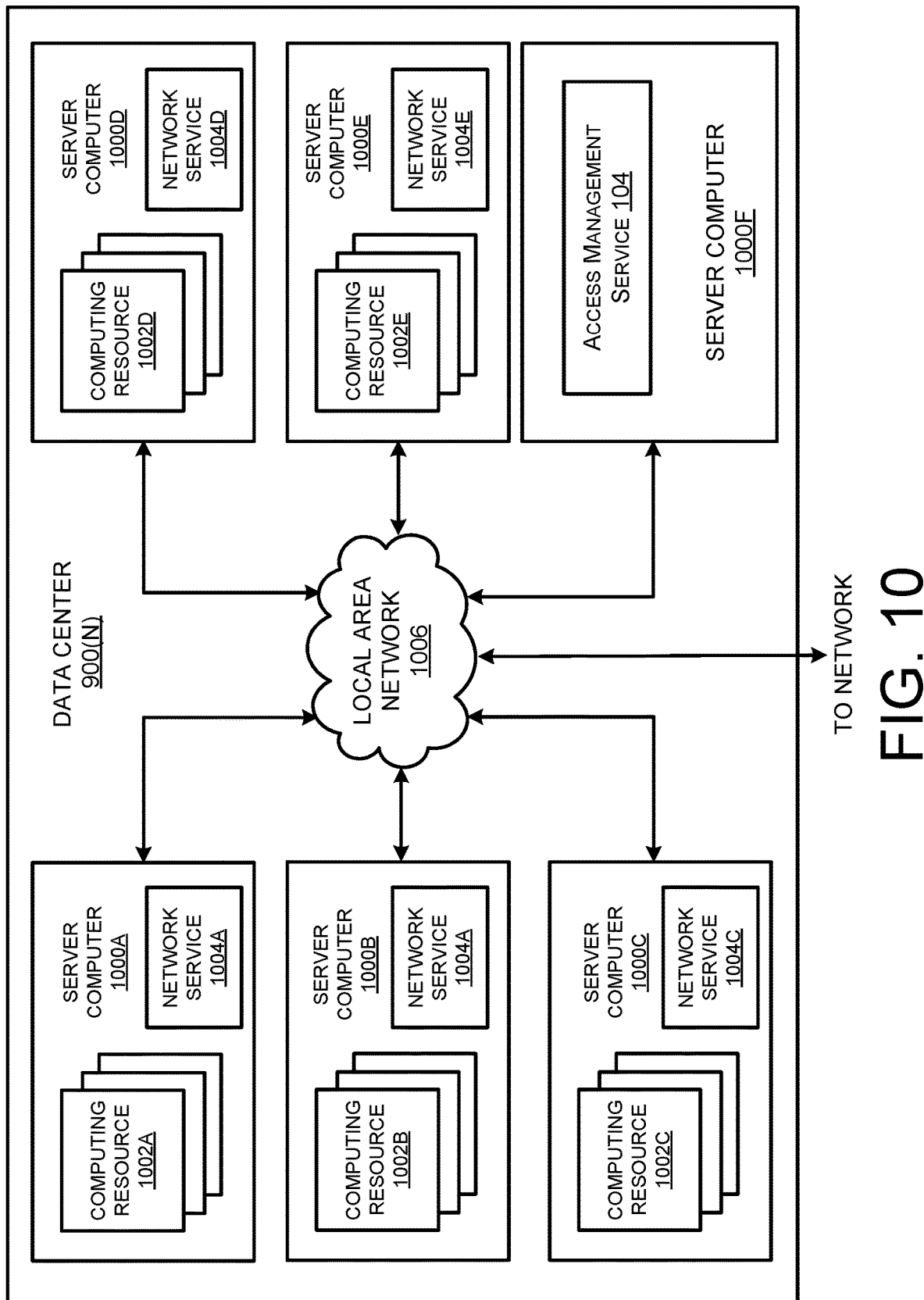
FIG. 10 is a computing system diagram illustrating a configuration for a data center that can be utilized to implement aspects of the technologies disclosed herein.

FIG. 10 is a computing system diagram that illustrates one configuration for a data center 900(N) that can be utilized to implement the AMS 102 as described above in FIGS. 1-8, and/or any other network services disclosed herein, such as the computing instance 106 and/or the access manager 108. The example data center 900(N) shown in FIG. 10 includes several server computers 1000A-1000E (collectively 1000) for providing the computing resources 1002A-1002E (collectively 1002), respectively.

The server computers 1000 can be standard tower, rackmount, or blade server computers configured appropriately for providing the various computing resources described herein (illustrated in FIG. 10 as the computing resources 1002A-1002E). As mentioned above, the computing resources 1002 provided by the system, or a larger system of which the system is a part, can include, without limitation, analytics applications, data storage resources, data processing resources such as VM instances or hardware computing systems, database resources, networking resources, and others. Some of the servers 1000 can also be configured to execute network services 1004A-1004E (collectively 1004)

capable of instantiating, providing and/or managing the computing resources 1002, some of which are described in detail herein.

The data center 900(N) shown in FIG. 10 also includes a server computer 1000F that can execute some or all of the software components described above. For example, and without limitation, the server computer 1000F can be configured to execute the AMS 102. The server computer 1000F can also be configured to execute other components and/or to store data for providing some or all of the functionality described herein. In this regard, it should be appreciated that components or different instances of the AMS 102 can execute on many other physical or virtual servers in the data centers 800 in various configurations.

In the example data center 900(N) shown in FIG. 10, an appropriate LAN 1006 is also utilized to interconnect the server computers 1000A-1000F. The LAN 1006 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 900(1)-(N), between each of the server computers 1000A-1000F in each data center 900, and, potentially, between computing resources 1002 in each of the data centers 900. It should be appreciated that the configuration of the data center 800 described with reference to FIG. 10 is merely illustrative and that other implementations can be utilized.

Figure 11:
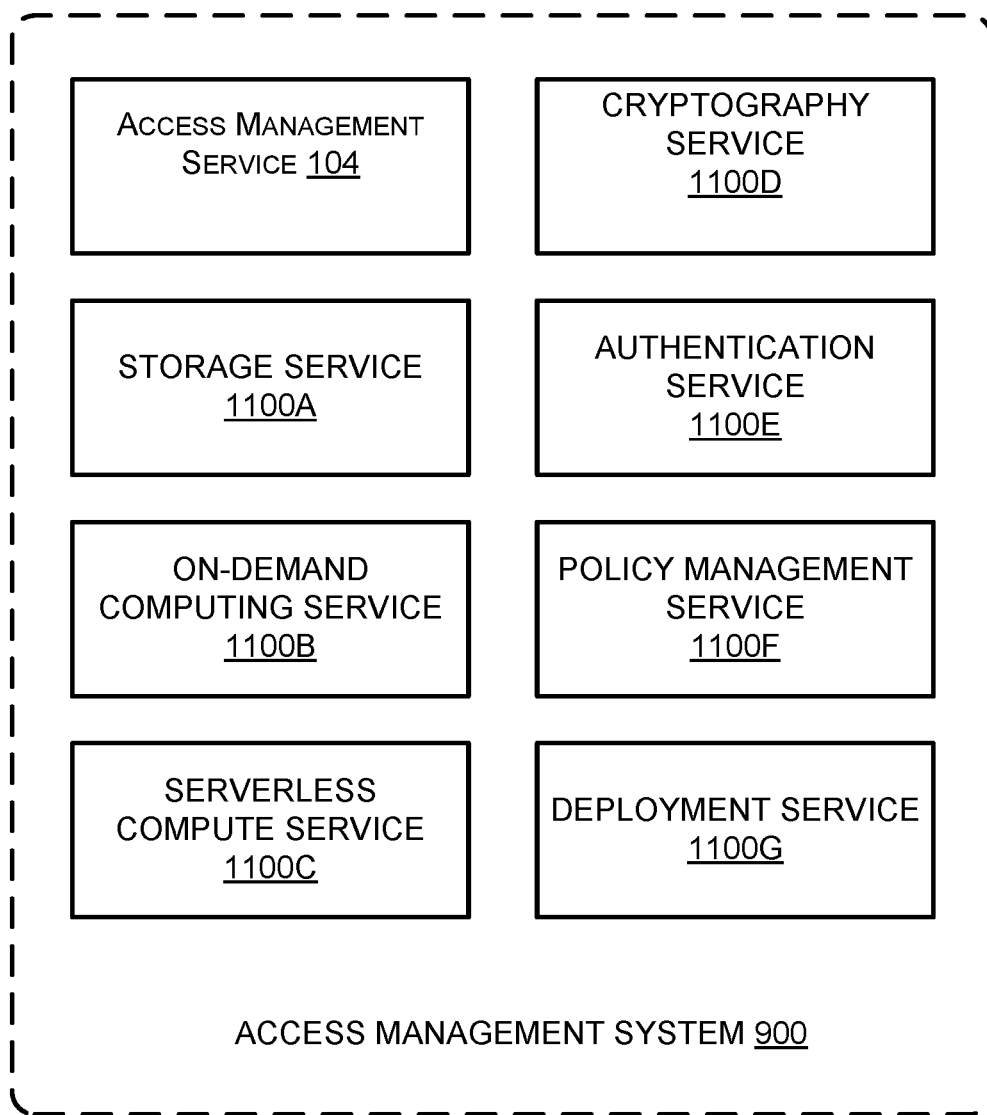
FIG. 11 is a network services diagram that shows aspects of several services that can be provided by and utilized within a system, or a larger system of which the system is a part, which is configured to implement the various technologies disclosed herein.

FIG. 11 is a network services diagram that shows aspects of several services that can be provided by and utilized within the system 900, or a larger system of which the system is a part, which is configured to implement the various technologies disclosed herein. In particular, and as discussed above, the system, or a larger system of which the system is a part, can provide a variety of network services to users and other users including, but not limited to, the service 104 and/or the computing instance 106, a storage service 1100A, an on-demand computing service 1100B, a serverless compute service 1100C, a cryptography service 1100D, an authentication service 1100E, a policy management service 1100F, and a deployment service 1100G. The system, or a larger system of which the system is a part, can also provide other types of network services, some of which are described below.

It is also noted that not all configurations described include the network services shown in FIG. 11 and that additional network services can be provided in addition to, or as an alternative to, the services explicitly described herein. Each of the services shown in FIG. 11 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 11 will now be provided.

The storage service 1100A can be a network-based storage service that stores data obtained from users of the system, or a larger system of which the system is a part. The data stored by the storage service 1100A can be obtained from computing devices of users.

The on-demand computing service 1100B can be a collection of computing resources configured to instantiate VM instances and to provide other types of computing resources on demand. For example, a user of the system, or a larger system of which the system is a part, can interact with the on-demand computing service 1100B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1100B is shown in FIG. 11, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1100C is a network service that allows users to execute code (which might be referred to herein as a "function") without provisioning or managing server computers in the system, or a larger system of which the system is a part. Rather, the serverless compute service 1100C can automatically run code in response to the occurrence of events. The code that is executed can be stored by the storage service 1100A or in another network accessible location.

In this regard, it is to be appreciated that the term "serverless compute service" as used herein is not intended to infer that servers are not utilized to execute the program code, but rather that the serverless compute service 1100C enables code to be executed without requiring a user to provision or manage server computers. The serverless compute service 1100C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1100D. The cryptography service 1100D can utilize storage services of the system, or a larger system of which the system is a part, such as the storage service 1100A, to store encryption keys in encrypted form, whereby the keys can be usable to decrypt user keys accessible only to particular devices of the cryptography service 1100D. The cryptography service 1100D can also provide other types of functionality not specifically mentioned herein.

The system, or a larger system of which the system is a part, in various configurations, also includes an authentication service 1100E and a policy management service 1100F. The authentication service 1100E, in one example, is a computer system (i.e., collection of computing resources 1002) configured to perform operations involved in authentication of users or customers. For instance, one of the services shown in FIG. 11 can provide information from a user or customer to the authentication service 1100E to receive information in return that indicates whether or not the requests submitted by the user or the customer are authentic.

The policy management service 1100F, in one example, is a network service configured to manage policies on behalf of users or customers of the system, or a larger system of which the system is a part. The policy management service 1100F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1100G for deploying program code in some configurations. The deployment service 1100G provides functionality for deploying program code, such as to virtual or physical hosts provided by the on-demand computing service 1100B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 12:
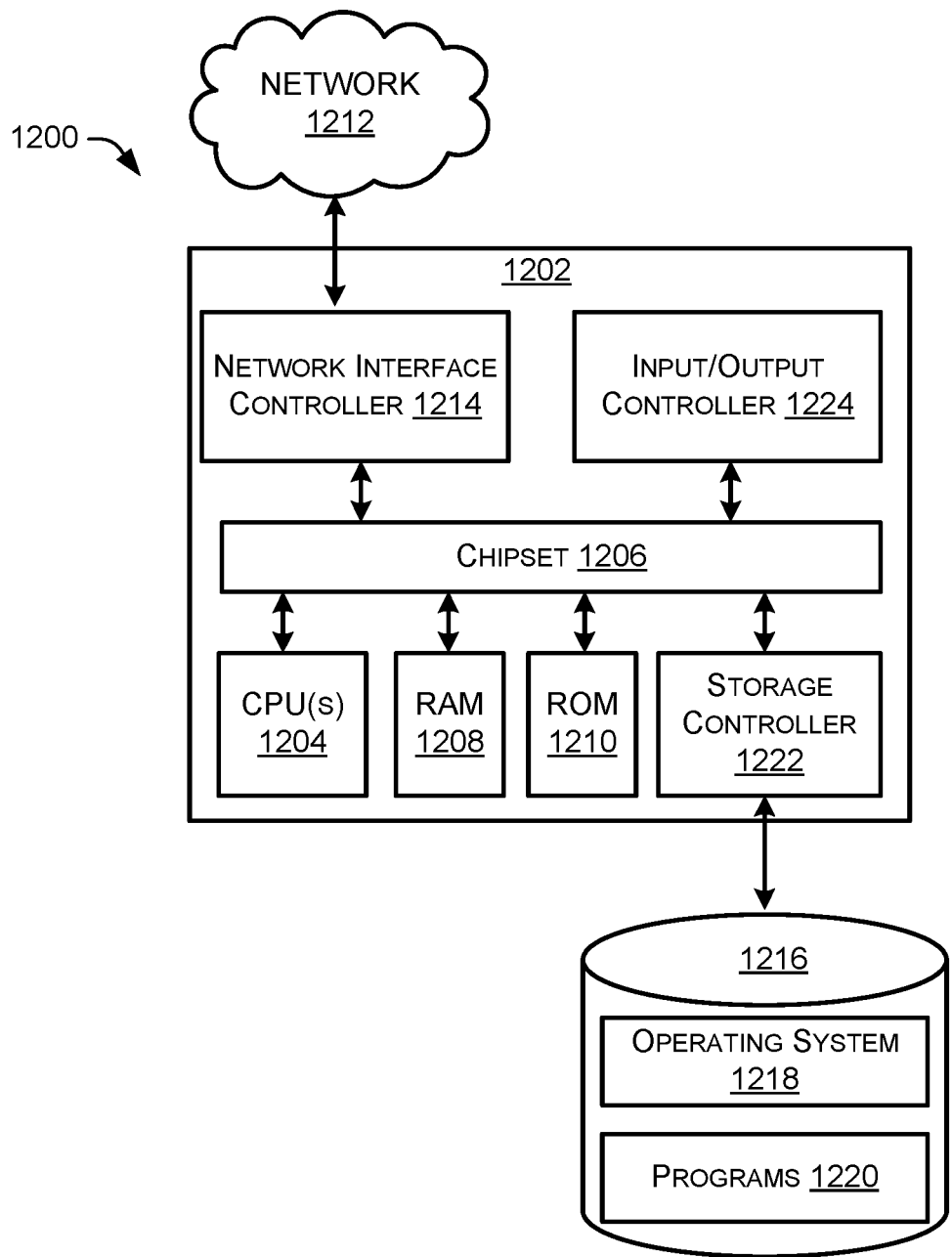
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The computer 1200 may represent architecture for a naming service, a concentrator, a reader, and/or other devices described herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1212. The chipset 1206 can include functionality for providing network connectivity through a NIC 1214, such as a gigabit Ethernet adapter. The NIC 1214 is capable of connecting the computer 1200 to other computing devices over the network 1212. It should be appreciated that multiple NICs 1214 can be present in the computer 1200, connecting the computer to other types of networks and remote computer systems.

The computer 1200 can be connected to a mass storage device 1216 that provides non-volatile storage for the computer. The mass storage device 1216 can store an operating system 1218, programs 1220, and data, which have been described in greater detail herein. The mass storage device 1216 can be connected to the computer 1200 through a storage controller 1222 connected to the chipset 1206. The mass storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1216 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1216 is characterized as primary or secondary storage, and the like.

For example, the computer 1200 can store information to the mass storage device 1216 by issuing instructions through the storage controller 1222 to alter the magnetic characteristics of a particular location within a magnetic disk drive unit, the reflective or refractive characteristics of a particular unit in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1216 by detecting the physical states or characteristics of one or more particular locations within the physical storage units.

In addition to the mass storage device 1216 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1216 can store an operating system 1218 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1216 can store other system or application programs and data utilized by the computer 1200.

In one configuration, the mass storage device 1216 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above. The computer 1200 can also include computer-readable storage media for performing any of the other computer-implemented operations described herein.

The computer 1200 can also include one or more input/output controllers 1224 for receiving and processing input from a number of input devices, such as a keyboard, a mouse, a touchpad, a touch screen, an electronic stylus, or other type of input device. Similarly, an input/output controller 1224 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
determining a first access policy associated with a user, the first access policy being associated with a first tag, including a first key-value pair, and specifying one or more resources that the user is authorized to access;
determining a second access policy associated with a resource, the second access policy being associated with a second tag, including a second key-value pair, and specifying at least one of one or more users or one or more groups of users that are authorized to access the resource;
receiving, from a device of the user, a request to access the resource;
determining whether the user is authorized to access the resource based at least in part on at least one of the first access policy or the second access policy, the first access policy indicating one or more roles assigned to the user; and
determining whether the user is authorized to access the resource based at least in part on the one or more roles and, one or more permissions associated with the one or more roles, and a comparison of the first key-value pair and the second key-value pair.

2. The method as recited in claim 1, wherein the first access policy is associated with the one or more roles or the one or more permissions.

3. The method as recited in claim 2, wherein the one or more roles authorize the user to conduct a search with respect to the resource.

4. The method as recited in claim 2, wherein the one or more roles authorize the user to associate one or more tags with the resource.

5. The method as recited in claim 1, further comprising:
associating the first tag with the user, the first tag being associated with first metadata;
associating the second tag with the resource, the second tag being associated with second metadata; and
determining whether the user is authorized to access the resource based at least in part on at least one of the first metadata or the second metadata.

6. The method as recited in claim 5, further comprising:
maintaining a first profile associated with the user;
maintaining a second profile associated with the resource;
associating the first tag with the first profile; and
associating the second tag with the second profile.

7. The method as recited in claim 1, further comprising determining that the user is authorized to access the resource based at least in part on at least one of the first access policy or the second access policy indicating that the user is authorized to access the resource.

8. A method comprising:
determining at least one of a first access policy associated with a user or a first tag associated with the user, the user being associated with one or more roles and one or more permissions associated with the one or more roles;

determining at least one of a second access policy associated with a resource or a second tag associated with the resource;

receiving, from a device of the user, a request to access the resource;

denying the request by preventing the user accessing the resource, wherein denying the request is based at least in part on at least one of the first access policy, the first tag, the second access policy, or the second tag;

identifying one or more different resources associated with first data that is determined to be similar to second data associated with the resource; and based at least in part on denying the request, causing an indication that identifies the one or more different resources to be sent to a computing device associated with the user.

9. The method as recited in claim 8, wherein:

the first access policy specifies one or more resources that the user is authorized to access; and the second access policy identifies at least one of one or more users or one or more groups of users that are authorized to access the resource.

10. The method as recited in claim 8, wherein denying the request comprises at least one of determining that the first access policy does not identify the resource or determining that the second access policy does not identify the user or a group of users associated with the user.

11. The method as recited in claim 8, further comprising:

receiving, from a second device of a second user, a second request to access the resource;

determining a third access policy associated with the second user or a third tag associated with the second user, the second user being associated with at least one of a second role or one or more second permissions; and authorizing, based at least in part on at least one of the second access policy, the second tag, the third access policy, or the third tag, the second user to access the resource.

12. The method as recited in claim 8, wherein the request is received by a service associated with the resource, and wherein an administrator of the service is authorized to authorize new users, create new resources, add, remove, or modify access authorizations associated with an existing user, and add, remove, or modify information associated with an existing resource.

13. The method as recited in claim 8, wherein the one or more roles at least one of authorize the user to conduct a search with respect to the resource or authorize the user to associate one or more tags with the resource.

14. The method as recited in claim 8, further comprising:

maintaining a first profile associated with the user;

maintaining a second profile associated with the resource;

associating the first tag with the first profile; and associating the second tag with the second profile.

15. A method comprising:

automatically applying one or more first tags to a new resource based at least in part on one or more second tags associated with one or more existing resources that are determined to be similar to the resource;

determining one or more roles associated with a user, the one or more roles being associated with one or more permissions indicating that the user is authorized to access one or more resources;

receiving, from a device of the user, a request to access the new resource; and determining, based at least in part on the one or more roles and the request, whether the user is authorized to access the new resource.

16. The method as recited in claim 15, further comprising:

determining that the one or more permissions indicate that the user is authorized to access the new resource; and authorizing, based at least in part on the one or more permissions and the request, the user to access the new resource.

17. The method as recited in claim 15, further comprising:

determining that the one or more permissions omit a permission indicating that the user is authorized to access the new resource; and denying, based at least in part on the one or more permissions and the request, authorization for the user to access the new resource.

18. The method as recited in claim 15, further comprising:

determining a first access policy associated with the user, the first access policy specifying the one or more resources that the user is authorized to access;

determining a second access policy associated with the new resource, the second access policy specifying one or more users or one or more groups of users that are authorized to access the new resource; and fulfilling or denying the request based at least in part on at least one of the first access policy or the second access policy.

19. The method as recited in claim 15, further comprising:

authorizing, based at least in part on the one or more permissions and the request, the user to access the new resource;

receiving, from the device, a second request to access a second resource that is different than the new resource; and denying, based at least in part on the one or more permissions, the second request by preventing the user from accessing the second resource.

20. The method as recited in claim 15, wherein the one or more roles at least one of authorize the user to conduct a search with respect to the new resource or authorize the user to associate one or more additional tags with the new resource.

* * * * *